Figure 1:
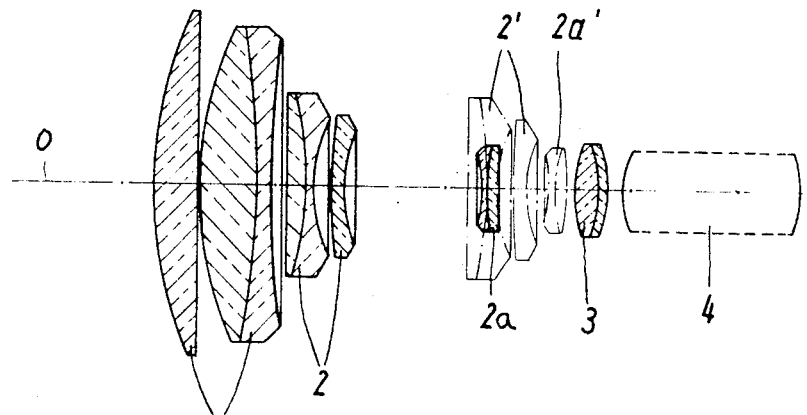

OR 3,550,518

7350/429

United States

[11] 3,550,518

| [72] | Inventors | Paul Himm<br>Otto Thoma..........................., Germany |
|---|---|---|
| [21] | Appl. No. | 731,790 |
| [22] | Filed | May 24, 1968 |
| [45] | Patented | Dec. 29, 1970 |
| [73] | Assignee | Jos Schneider & Co.<br>Bad Kreuznach, Germany<br>a corporation of Germany |
| [32] | Priority | June 2, 1967 |
| [33] | | Germany |
| [31] | | No. Sch40819 |

[54] MECHANISM FOR DIFFERENTIALLY DISPLACING TWO OPTICAL COMPONENTS
11 Claims, 2 Drawing Figs.

[52] U.S. Cl.................................................. 95/45,
350/187; 355/58
[51] Int. Cl..................................................... G03b 3/00
[50] Field of Search............................................ 95/45, 44;
350/41, 44, 46, 187; 355/58

References Cited
UNITED STATES PATENTS

| 2,515,104 | 7/1950 | Walker.................... | 350/187 |
| 2,746,350 | 5/1956 | Hopkins..................... | 95/45X |
| 3,059,534 | 10/1962 | Keznickl...................... | 95/45X |
| 3,106,125 | 10/1963 | Martin et al. ................. | 95/45X |
| 3,445,155 | 5/1969 | Sturrock....................... | 350/187X |

*Primary Examiner*—John M. Horan
*Assistant Examiner*—Richard L. Moses
*Attorney*—Karl F. Ross ABSTRACT: Optical objective having two components displaceable along an optical axis with relative differential motion designed to provide a predetermined optical effect, such as a fixed image plane in a varifocal system; one of these components is freely movable by hand or by automatic means and is in positive engagement, via two spaced rollers, with opposite camming edges of a curved guide ridge on a spring-biased swingable member having a guide slot in positive engagement with a roller on the other component.

PATENTED DEC 29 1970    3,550,518

Paul Himmelsbach
Otto Thomas
Inventors.

By Karl F. Ross
Attorney

MECHANISM FOR DIFFERENTIALLY DISPLACING TWO OPTICAL COMPONENTS

Out present invention relates to an optical objective, e.g. as used in photographic, cinematographic or television cameras, in which two components are axially displaceable at different rates for purposes of focusing or, as is the more usual case, to vary the overall focal length of the objective while keeping its image plane fixed. Such varifocal objective systems are disclosed, for example, in commonly owned U.S. Pat. No. 3,165,044 to Paul Himmelsbach and U.S. Pat. No. 3,095,750 to Herbert Mahn.

In these prior systems, the differential displacement of the two concurrently movable components is brought about by separate camming formations, such as slots or grooves, in a rotatable control member. To avoid the need for such separate camming formations, which must be individually machined with great accuracy; there have already been proposed improvements whereby use is made of only one curve for the guidance of two differentially movable optical components. Reference is made in this connection to two commonly owned pending applications by Paul Himmelsbach, i.e. Ser. No. 620,973 filed Mar. 6, 1967 and Ser. No. 640,862 filed May 24, 1967, now Pat. Nos. 3,480,349 and 3,496,851. The first of these applications teaches the provision of a rotatable cam which turns about a fixed fulcrum in response to the axial displacement of a first component from a reference position, the cam being connected with this first component via a flexible link and controlling by its rotation the movement of the second component. According to the second Himmelsbach application, a cam follower swingably mounted on the first component has one end in contact with a fixed cam and another end in engagement with the controlled second component. In each case, the law of relative motion of the two components is determined solely by the shape of the cam.

In another commonly owned pending application, Ser. No. 673,551 filed Oct. 9, 1967, now U.S. Pat. No. 3,533,344, by Otto Thomas, there is disclosed a system of the general type described which is mechanically simpler than that of the first Himmelsbach application, avoiding the need for a flexible link, and affords greater mobility of the two components (including possible reversal of their relative motion) than does the system of the last-mentioned Himmelsbach patent. That system comprises a swingable member with two camming edges, each of the two axially movable components having a respective cam follower in contact with one of these edges. As the first or master component is axially displaced, it causes the cam member to swing and to move the second component in a predetermined manner. A biasing spring is provided to keep the two cam followers in contact with their respective edges.

The use of a spring to hold a cam follower in contact with a generally axially extending camming edge of a swingable guide member, as disclosed in the Thomas application last referred to, uniquely determines the position of the controlled or slave component for every position of the controlling or master component, regardless of the direction of displacement of the latter and the sign of the camming angle. Nevertheless, upon rapid displacement of the cam follower across a receding cam portion it may happen that the follower does not hug the cam as closely as would be desirable for optimum performance. The general object of our invention, therefore, it to provide means in such system for minimizing this possibility of deviation of the two components from their predetermined relative position in any phase of adjustment.

This object is realized, pursuant to our invention, by the provision of a curved guide formation with two generally parallel camming edges on the swingable member, associated cam-follower means on the first component being arranged for substantially concurrent engagement with both camming edges; in a preferred embodiment, the guide formation is a generally axially extending ridge, the associate cam-follower means being a pair of abutments confronting the two edges of that ridge while lying on a line generally transverse to its center line. In order to minimize play while allowing for changes in camming angle, the width of the ridge varies so that both abutments are always closely spaced from their respective edges, one abutment being continuously maintained in contact with its edge through a spring acting as a restraining means. The other abutment, therefore, serves to prevent any substantial departure of the first abutment from its camming edge.

The swingable member of the system according to our invention is also positively coupled to the second or controlled component, again by two-edge contact between coacting formations which may include a slot on the swingable member; to minimize any lost motion occurring in this coupling mechanism, a coil spring or equivalent biasing means is used in this case, too, for maintaining permanent contact between one edge of the camming formation and an associate follower. Advantageously, the several followers are rollers constituting the outer races of ball or needle bearings.

Figure 2:
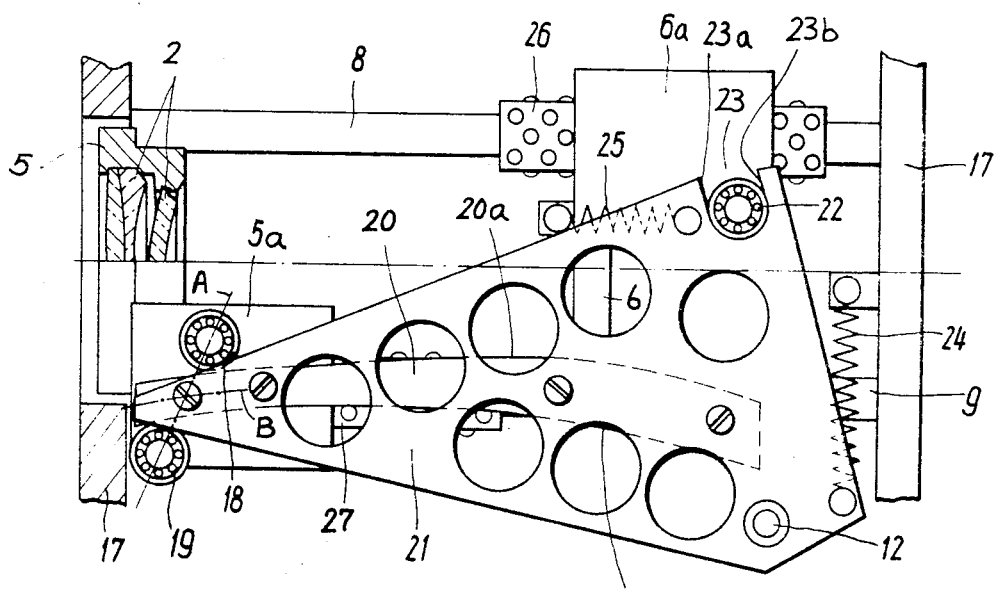

The invention will be described in greater detail with reference to the accompanying drawing in which:

FIG. 1 is a somewhat diagrammatical sectional view of a varifocal objective with two axially movable components; and FIG. 2 is a side elevational view (with parts broken away) of an objective housing containing part of the optical system of FIG. 1 along with a control mechanism according to the invention.

In FIG. 1 we have shown a conventional varifocal objective with a fixed positive front component 1 (here consisting of two air-spaced lens members), a first axially movable component 2 of negative refractivity (also constituted by two lens members), a second axially movable component 2a whose refractivity may also be negative, and another fixed positive component 3, these components together representing a varifocal attachment for a fixed basic objective 4 of conventional construction. Movable components 2 and 2a are held in two relatively movable lens mounts 5 and 6 having respective extensions 5a and 6a which are guided for axial reciprocation on fixed rods 9 and 8, respectively, extending parallel to the objective axis 0; although only two rods are shown, each of these rods preferably has a parallel mate to stabilize the corresponding lens mount (e.g. in diagonally opposite positions as illustrated in the aforementioned Thomas application). The rods 8, 9 are supported in a generally cylindrical housing 17 enclosing the components 1, 2, 2a and 3. Components 2, 2a can be displaced along axis 0, as shown in FIG. 1, between a first limiting position illustrated in full lines and a second limiting position illustrated in dot-dash lines, the components in the latter position having been designated by primed reference numerals.

A generally triangular member 21 is swingable about a pivot pin 12 rigid with the housing 17, the plane of swing being parallel to housing axis 0. The surface of member 21 confronting this axis carries a curved ridge 20 having a convex upper camming edge 20a and a concave lower camming edge 20a, the two edges being generally parallel but diverging somewhat in the direction of fulcrum 12. Two cam followers 18 and 19 on lens-mount extension 5a are in substantially concurrent engagement with edges 20a and 20b, respectively, allowing at most a slight amount of play therebetween; these cam followers are the outer races of respective ball bearings journaled on extension 5a. A similar bearing race 22 is journaled on lens-mount extension 6a and fits closely between the edges 23a, 23b of a camming slot 23 of swingable member 21. A coil spring 24, anchored to housing 17 and to member 21, tends to swing the latter counterclockwise about its pivot 12, thereby maintaining the abutment roller 19 in steady contact with the lower edge 20b or ridge 20. Another spring 25, anchored to lens-mount extension 6a and to member 21, exerts a torque in the same counterclockwise sense upon this member and tends to keep the abutment roller 22 engaged with slot edge 23b. These springs, therefore, eliminate any lost motion in the two positive couplings 18—20 and 22, 23.

The centers of rollers 18 and 19 are spaced apart along a line A which is generally transverse to the curved center line B of ridge 20, the width of the ridge varying throughout its length in the same sense as the angle included between the lines A and B in order to maintain the same close spacing between the ridge and the rollers 18, 19 in all relative positions of members 5a and 21.

For easier sliding, the lens mounts 6 and 5 are supported on their guide rods 8 and 9 through the intermediary of ball-studded sleeves 26 and 27.

In operation, a rightward displacement of lens mount 5 from its reference position illustrated in FIG. 2 causes the cam member 21 to swing, under the joint action of spring 24 and rollers 18 and 19, first counterclockwise and later clockwise, with a resultant displacement of lens mount 6 first to the left and later to the right. The movement of the master component 2 in its lens mount 5 may be brought about manually or by automatic means, e.g. with the aid of a reversible electric motor as disclosed in the first-mentioned Himmelsbach patent; a fluid-operated piston, as described in the aforementioned Thomas application, could also be se used.

Since the spring 24 extends approximately parallel to the narrow base of the triangular cam member 21, thus generally at right angles to the ridge 20 thereof, this spring can be made relatively short; also, in view of the small moment arm effective between the spring 24 and the fulcrum 12, the proportional elongation of the spring is minor so as to reduce the risk of fatiguing. Spring 25 can also be made quite short and of small proportional elongation. Moreover, the short moment arm of spring 24 prevents the ridge 20 from exerting upon the roller 19 a camming force capable of spontaneously displacing the lens mount 5 on its low-friction support 27 in certain positions in which the tangent to edge 20b includes an appreciable camming angle with the axial direction.

Naturally, the positive coupling 22, 23 between members 6a and 21 could be replaced by an arrangement generally similar to that shown 1 at 18—20, i.e. a ridge on member 21 bracketed by a pair of rollers on member 6a or vice versa. Also, in lieu of a single roller 22, we may use a pair of such rollers respectively bearing upon the two slot edges 23a and 23b, and in like manner the ridge 20 could be replaced by a guide formation in the shape of a slot or groove having respective edges engaged by the rollers 18 and 19. These and other modifications, readily apparent to persons skilled in the art, are intended to be embraced within the spirit and scope of our invention as defined in the appended claims.

We claim:

1. In an optical objective having a first and a second component reciprocable along a common optical axis and a housing for said components, the combination therewith of a swingable member having a curved guide formation with two generally parallel camming edges, said member being fixedly fulcrumed on said housing, cam-follower means secured to said first component for substantially concurrent engagement with both said camming edges, positive coupling means linking said second component with said member, and a spring anchored to said housing and to said member for maintaining said cam-follower means in continuous contact with one of said camming edges during axial displacement of said first component with consequent swinging of said member and axial displacement of said second component according to a predetermined law of relative motion, said spring extending generally perpendicularly to said guide formation and defining a short moment arm with the fulcrum of said member, the latter being generally triangular with a narrow base approximately parallel to said spring.

2. The combination defined in claim 1 wherein said guide formation is a ridge extending in generally axial direction.

3. The combination defined in claim 1 wherein said positive coupling means comprises a roller journaled on said second component, said member being provided with a slot receiving said roller.

4. In an optical objective having a first and a second component reciprocable along a common optical axis, the combination therewith of a swingable member having a curved ridge with two generally parallel camming edges, a pair of abutments secured to said first component and spaced along a line generally transverse to said ridge for substantially concurrent engagement with both said camming edges, the width said ridge varying with the angle included between said line and the center line of said ridge, positive coupling means linking said second component with said member, and restraining means for maintaining said abutments in continuous contact with one of said camming edges during axial displacement of said first component with consequent swinging of said member and axial displacement of said second component according to a predetermined law of relative motion.

5. The combination defined in claim 4 wherein said objective includes a housing for said components, said member being fixedly fulcrumed on said housing, said restraining means including a spring anchored to said housing and to said member.

6. The combination defined in claim 5 wherein said spring extends generally perpendicularly to said ridge and defines s a short moment arm with the fulcrum of said member.

7. The combination defined in claim 6 wherein said member is generally triangular with a narrow base approximately parallel to said spring.

8. The combination defined in claim 4 wherein said abutments are bearing-supported rollers.

9. In an optical objective having a first and a second component reciprocable along a common optical axis, the combination therewith of a swingable member having a curved guide formation with two generally parallel camming edges, cam-follower means secured to said first component for substantially concurrent engagement with both said camming edges, a roller journaled on said second component, said member having a slot engaged by said roller for positive coupling with said second component, and restraining means for maintaining said cam-follower means in continuous contact with one of said camming edges during axial displacement of said first component with consequent swinging of said member and axial displacement of said second component according to a predetermined law of relative motion.

10. The combination defined in claim 9, further comprising biasing means anchored to said second component and said member for maintaining an edge of said slot in contact with said role roller.

11. The combination defined in claim 10 wherein said objective includes a housing for said components, said member being fixedly fulcrumed on said housing, said restraining means including a first spring anchored to said housing and to said member, said biasing means including a second spring tending to rotate said member about its fulcrum in the same sense as said first spring.